… … …

United States Patent Office 2,881,204
Patented Apr. 7, 1959

2,881,204

OXYALKYLATED HYDROXY COMPOUNDS

Willard H. Kirkpatrick, Sugar Land, Tex., assignor to Visco Products Company, Sugar Land, Tex., a corporation of Delaware No Drawing. Application February 13, 1953
Serial No. 336,876

10 Claims. (Cl. 260—484)

This invention relates in particular to the treatment of emulsions of mineral oil and water, such as petroleum emulsions commonly encountered in the production, handling and refining of crude mineral oil for the purpose of separating the oil from the water. Also, the invention relates to the treatment of other water-in-oil type of emulsions wherein the emulsions are produced artificially or naturally and the resolution of the emulsions presents a problem of recovery or disposal.

Petroleum emulsions are in general of the water-in-oil type wherein the oil acts as a continuous phase for the dispersal of finely divided particles of naturally occurring waters or brines. These emulsions are often extremely stable and will not resolve on long standing. It is to be understood that water-in-oil emulsions may occur artificially resulting from any one or more of numerous operations encountered in various industries. The emulsions obtained from producing wells and from the bottom of crude oil storage tanks are commonly referred to as "cut oil," "emulsified oil," "bottom settlings," and "B.S."

One type of process involves subjecting an emulsion of the water-in-oil type to the action of a demulsifying agent of the kind hereinafter described, thereby causing the emulsion to resolve and stratify into its component parts of oil and water or brine after the emulsion has been allowed to stand in a relatively quiescent state.

Another type of process involves the use of a demulsifying agent of the kind hereinafter described in acidizing operations on petroleum producing strata. In such an operation corrosion inhibited acid is forced down the well and into the formation under pressure. The acid attacks limestone formation enlarging the fissures and openings through which the oil fluids flow to the well pool, thus increasing the production. In many case, particularly troublesome emulsions are encountered immediately after a well has been acidized. This condition can be minimized and many times eliminated by incorporating a suitable demulsifying composition with the acidizing medium.

Still another type of process involves the use of a demulsifying agent of the kind hereinafter described in refinery desalting operations. In the refining of many crude oils a desalting operation is necessary in order to prevent the accumulation of large deposits of salt in the stills and to prevent corrosion resulting from the decomposition of such salts under high still temperatures. In a typical desalting installation 5% to 10% of fresh water is added to the crude oil charge stock and emulsified therein by means of a pump or through a differential pressure valve. A demulsifying agent is added and the treated oil permitted to stand in a quiescent state for relatively short periods of time allowing the salt-laden water to stratify, whereupon it is bled off to waste resulting in 90% to 98% removal of salt content. This operation is carried out continuously as contrasted with batch treating.

One object of my invention is to provide a novel and economical process for resolving emulsions of the character referred to into their component parts of oil and water or brine.

Another object is to provide a novel reagent which is water-wettable, interfacial and surface-active in order to enable its use as a demulsifier or for such uses where surface-active characteristics are necessary or desirable.

The treating agents employed in accordance with the present invention consist of compositions of high molecular weight which are oxyalkylated organic compounds from the group consisting of hydroxy carboxylic esters, hydroxy carboxylates, hydroxy carboxylic acid amides, hydroxy sulfonic acid esters, hydroxy sulfonates and hydroxy sulfonic acid amides, wherein the hydroxy group is oxyalkylated with a compound from the group consisting of propylene oxide (e.g., 1,2-propylene oxide) and mixtures of ethylene oxide and propylene oxide, with the further provisos that the oxypropylene groups constitute at least 20% and up to 100% by weight of all of the oxyalkylene groups in said high molecular weight composition, that at least 60% of the molecular weight of the effective composition is attributable to oxyalkylene groups, and that the molecular weight is at least 1000 where the oxyalkylene groups consist of oxyethylene and oxypropylene groups and at least 1200, preferably at least 2000, where the oxyalkylene groups consist solely of oxypropylene groups. In the preferred practice of the invention the best results have been obtained with compounds in which the portion of the average molecular weight of the treating agent attributable to oxypropylene groups is at least 2000. Especially good results have been obtained with compositions of the class described wherein the average molecular weights are within the range of 2100 to 7500.

It has been discovered that these compositions have unusual and unexpected properties for resolving water-in-oil emulsions into their component parts. One possible theory which may be postulated for the striking effectiveness of these compositions in resolving petroleum emulsions is a hydrophobe-hydrophile balance which has not been secured heretofore with compositions well known in this art.

The oxyalkylene groups in the compositions provided in accordance with the invention can be derived by employing as a starting material either 1,2-propylene oxide or a mixture of ethylene oxide and 1,2-propylene oxide in which the weight ratio of ethylene oxide to 1,2-propylene oxide is not greater than 4:1, or they can be derived by using as starting materials polyoxyalkylene aliphatic compounds derived from 1,2-propylene oxide or mixtures of ethylene oxide and 1,2-propylene oxide containing a weight ratio of ethylene oxide to 1,2-propylene oxide not greater than about 4:1 and having a hydroxy group attached to a terminal carbon atom of a polyoxyalkylene chain. If a preformed polyoxyalkylene compound containing a terminal hydroxy group is employed as a starting material the resultant reaction which occurs is a condensation reaction with the elimination of water between two hydroxy groups.

It is essential for the purpose of the invention that the carboxy group, or groups if there is more than one carboxy group, be blocked so that the oxyalkylation cannot occur at the acidic group. The same is true with respect to any sulfonic acid groups that might be present. The blocking is effected by salt formation, esterification or amidification.

Among the compounds which can be employed as a source of preformed hydroxy polyoxyalkylene compounds are the polyoxyalkylene polyols having terminal hydroxy groups and the corresponding compounds in which one of the terminal hydroxy groups is replaced by an ether group, including particularly polyoxypropylene glycols having terminal hydroxy groups and monoethers of polyoxypropylene glycols.

The preparation of polyoxyalkylene glycols which may be employed as starting materials for the purpose of this invention has been described in U.S. Patent 2,425,845. This patent describes the preparation of polyoxyalkylene diols prepared from the reaction of ethylene oxide, 1,2-propylene oxide and an aliphatic dihydroxy alcohol. The resulting heteric diols possess viscosity relationships, solubility relationships and fusion temperature relationships entirely unlike those expected, based on comparisons with polyoxyethylene glycols on the one hand and polyoxypropylene glycols on the other. For example, polyoxyethylene glycols of an average molecular weight of about 600 to 800 have the consistency of a semi-fluid, pasty mass. Below this range, the products are clear, normally liquid compositions which are miscible with water in all proportions. At and above the average molecular weight of 800 to 900 the polyoxyethylene glycols are low melting, normally solid compositions having a fusion temperature which increases with increased molecular weights from about 30° C. to a maximum of approximately 60° C. to 65° C. These solid products are miscible with water in all proportions. Polyoxypropylene compounds are known and available in molecular weights up to about 3000. However, the addition products resulting from the reaction of 1,2-propylene oxide with water are referred to in the literature but the properties are not described in a manner which would permit identification of the product. Monoethers of polyoxypropylene glycols have been described in U.S. Patent 2,448,664 and these compounds, unlike similar polyoxyethylene compounds are immiscible with water and are miscible with paraffinic hydrocarbons, the extent of miscibility being determined by temperature and nature of the ether grouping. The monoethers of polyoxypropylene glycol have unusual temperature-viscosity relationships in that while they retain adequate body at elevated temperatures they do not become unusually viscous at low temperatures. It is significant that these products having molecular weights of 2000 to 3000 are liquids whereas the corresponding polyoxyethylene compounds are solids.

The compositions of this invention wherein oxyethylene and oxypropylene groups are present in a random or alternate sequence possess characteristics which cannot be secured by a simple blending of polyoxyethylene compounds with polyoxypropylene compounds. It is possible within such a given molecule to secure a molecular weight from 3000 to 20,000 where the product remains liquid at normally prevailing temperatures. Such products are miscible in water and in oils. However, the water solubility decreases as the temperature is raised and at higher temperatures two-phase systems result. These characteristics are unusual and striking and would not be anticipated by careful consideration of the characteristics of polyoxyethylene glycols and polyoxy propylene glycols.

All of the compounds employed for the purpose of this invention are characterized by the nucleus $$-(OC_nH_{2n})_x-$$

wherein $n$ has a value of 3, or both 2 and 3 in a ratio such that the weight ratio of oxyethylene to oxypropylene does not exceed 4:1, and at least 60% by weight of the compound is attributable to the said oxyalkylene nucleus or nuclei.

The hydroxy acid derivative which is reacted with the alkylene oxide or a hydroxy polyoxyalkylene compound, as the case may be, preferably has the reactive hydroxy group attached to a terminal carbon atom. This is not essential in every case, but generally speaking, it leads to the formation of products which are more effective for the purpose of the invention. Especially good results have been obtained by employing hydroxy aliphatic acid derivatives of carboxylic and sulfonic acids, including, for example, oxidized fatty bodies, and oxidized petroleum bodies, wherein the free acid groups are block either by a salt-forming group, an amide group or an ester group.

As a further classification and specific illustration of compositions which are adapted for use in this invention, there can be mentioned: the oxyalkylated hydroxy carboxylic acid esters of hydroxy fatty acids (e. g., hydroxy acetic acid, lactic acid, hydroxy butyric acid, hydroxy stearic acid, and/or ricinoleic acid and aliphatic alcohols (e.g., methyl alcohol, ethyl alcohol, propyl alcohol, butyl alcohol, amyl alcohol, hexyl alcohol, lauryl alcohol, cetyl alcohol, oleyl alcohol, stearyl alcohol, and/or myricyl alcohol); the corresponding compounds in which the group which blocks the carboxylic group is a salt-forming group (e.g., sodium, potassium, calcium and/or ammonium); the corresponding compounds in which the group which blocks the acid group is an amide group; the oxyalkylated hydroxy aromatic acid esters, salts and amides (e.g., oxyalkylated salicylic acid esters, salts and amides; oxyalkylated hydroxy naphthoic acid esters, salts and amides; oxyalkylated toluic acid esters, salts and amides); and compounds corresponding to any or all of the previously listed compounds except that the carboxy group is replaced by a sulfonic group. In general, the preferred carboxy and sulfonic acid derivatives employed as starting materials are characterized by containing either one or two hydroxy groups and one, two or three carboxy and/or sulfonic groups. Examples of such compounds containing a single hydroxy group and a single carboxy group are the esters, salts and amides of: the hydroxy fatty acids, hydroxy phenyl acetic acid, the hydroxy naphthoic acids, and the hydroxy benzoic acids. Examples of compounds containing a single hydroxy group and two carboxy groups are the esters, salts and amides of: hydroxy succinic acid, hydroxy phthalic acid and hydroxy terephthalic acid. Examples of compounds containing a single hydroxy group and three carboxy groups are the esters, salts and amides of citric acid.

The starting materials which are reacted with the alkylene oxides or hydroxy polyoxyalkylene compounds can also contain a reactive primary or secondary amino group in addition to the reactive hydroxy group. Examples of such compounds are the esters, salts and amides of the various amino salicylic acids (e.g., para amino salicylic acid); the esters, salts and amides of hydroxy glutamic acid; the esters, salts and amides of serine; the esters, salts and amides of alpha-amino-beta-hydroxyl butyric acid; and the esters, salts and amides of hydrooxyproline.

The preferred compounds are those in which the initial carboxy or sulfonic acid esters, salts or amides contain no carbon chains longer than six carbon atoms. Such compounds are more hydrophilic than those in which longer carbon chains are present. By preparing compounds or compositions in which the ether oxygens and carboxy or sulfonic groups are spaced from each other by relatively short carbon chains, the hydrophile properties of the resultant product are increased. At the same time, due to their molecular weight the products have a substantial hydrophobe characteristic and a desirable hydrophobe-hydrophile balance is obtained. If it is desired to increase the hydrophobe characteristic this can be accomplished by employing as the initial reactants compounds containing long chains of carbon atoms, for example, those containing carbon chains of 8 to 30 carbon atoms. If it is desired to increase the hydrophile property of the resultant compounds this can be accomplished by adding additional hydrophile groups, namely, hydroxy, amino, carboxy and sulfonic groups. Thus, in some instances, in order to secure the proper hydrophobe-hydrophile balance it is desirable to hydrolyze the resultant salt, ester or amide to the corresponding acid. Reactions of this type can be carried out by standard procedures which are well known to those skilled in the art. When the resulting oxyalkylated acid is obtained the free carboxylic or free acidic groups are then reacted with monohydric alcohols, glycols, polyoxyalkylene glycols, amines, alkanolamines and polyamines to modify the surface-active characteristics of the compound to any desired extent. For example, the free acidic groups can be further reacted with alkalis, alcohols and amines to yield inorganic salts (e.g., sodium, potassium, ammonium), esters (e.g., methyl, ethyl, propyl, butyl and homologous derivatives), amine salts and amides, the amine salts being formed, for example, by reaction with alkyl, alkenyl, aralkyl, aralkenyl, aryl and/or cycloalkyl amines, such as ethyl amine, mono-, di- and triethanol amine, ethylenediamine, propylenediamine, diethylenetriamine, dipropylenetriamine, triethylenetetramine, tetraethylenepentamine, isopropylamine, butylamine, amylamine, cyclohexylamine, aniline, anisidine, toluidine and benzylamine.

The oxyalkylation step proceeds more smoothly and with better yields in the presence of certain catalysts. When using hydroxy ester compositions as starting materials for the oxyalkylation it is important to use a catalyst that is not sufficiently alkaline or acidic to hydrolyze the ester grouping. Boron trifluoride is such a catalyst and is recommended for use with esters. Where salts or amides are used as starting materials it is preferred to use sodium hydroxide which is an excellent catalyst for the oxyalkylation reaction.

Since as indicated above it is possible to prepare the compositions of this invention by various routes and from a number of different classes of starting materials the invention should not be limited by the following examples which are merely intended to illustrate some satisfactory procedures for preparing a few of the materials suitable for employment within the scope of the present invention.

*Example I*

*Step 1.*—Ninety-five (95) parts by weight of a mixture of equal amounts of ethylene oxide and propylene oxide are introduced into 22 parts by weight of methyl glycolate containing 1 part of boron trifluoride dispersed therein. The temperature is maintained at about 115° C. and the oxide mixture is introduced into the methyl glycolate at such a rate that the pressure is maintained at about 26 pounds per square inch over a period of 3 hours.

*Step 2.*—To 40 parts by weight of the reaction product of Step 1 is added 0.5 part by weight of boron trifluoride, following with 70 parts by weight of a mixture of equal parts of ethylene oxide and 1,2-propylene oxide. The temperature is maintained at about 115° C. during the reaction and the oxide mixture is supplied at such a rate as to maintain a pressure of about 22 pounds per square inch. The reaction time is about 2 hours. The reaction product is a linear carboxy acid ester wherein the chain is composed of heteric oxyethylene and oxy-1,2-propylene groupings. The reaction is interrupted at different intervals and a portion of the reaction product is removed in an effort to secure oxyalkylated derivatives having varying molecular weights between 1500 and 5000. For example, it is desired that one derivative have a molecular weight of 1500, the second 2500, the third 3500 and the fourth 5000. This procedure can be varied at will in order to secure derivatives having any specified or desired molecular weight.

*Example II*

One hundred (100) parts by weight of a mixture consisting of 3 parts of propylene oxide and 1 part of ethylene oxide are introduced into 27 parts of ethyl lactate containing 1 part of boron trifluoride dispersed therein. The temperature is maintained at about 120° C. and the oxide mixture is introduced into the ethyl lactate at such a rate that the pressure is maintained at about 20 pounds per square inch over a period of about 3 hours.

Fifty (50) parts by weight of the reaction product of Step 1 is further reacted following the procedure of Step 2 of Example I. Four derivatives are prepared having molecular weights between 1500 and 5000.

*Example III*

One hundred (100) parts by weight of propylene oxide is introduced into 30 parts by weight of the sodium salt of beta hydroxybutyric acid containing 3 parts of pulverized sodium hydroxide dispersed therein. The temperature is maintained at about 125° C. and the propylene oxide is introduced into the sodium salt at such a rate that the pressure is maintained at about 20 pounds per square inch over a period of about 3 hours.

Fifty (50) parts by weight of the reaction product of Step 1 is further reacted in the presence of an additional 3 parts of pulverized sodium hydroxide with 100 parts by weight of propylene oxide. The temperature is maintained at about 115° C. during the reaction and the oxide supplied at such a rate as to maintain a pressure of about 22 pounds per square inch. The reaction is interrupted at varying intervals in order to secure derivatives having molecular weights respectively of about 1500, 2500, 3500, and 5000.

*Example IV*

One hundred (100) parts by weight of a mixture of equal amounts of ethylene oxide and propylene oxide are introduced into 150 parts by weight of the sodium salt of 12-hydroxy stearic acid containing 3 parts of pulverized sodium hydroxide dispersed therein. The temperature is maintained at about 115° C. and the oxide mixture is introduced into the hydroxy stearic product at such a rate that the pressure is maintained at about 26 pounds per square inch over a period of about 5 hours.

The intermediate product as above prepared is further reacted in accordance with the directions of Step 2 of Example I with the exception that 3 parts of pulverized sodium hydroxide is used in place of the boron trifluoride.

*Example V*

One hundred (100) parts by weight of a mixture of 3 parts of ethylene oxide and 1 part of propylene oxide is introduced into 150 parts by weight of lauramide of glycolic acid containing 3 parts of pulverized sodium hydroxide dispersed therein. The temperature is maintained at about 120° C. and the oxide mixture is introduced into the amide at such a rate that the pressure is maintained at about 30 pounds per square inch over a period of about 5 hours.

To 100 parts of the above intermediate product there is added an additional 3 parts of pulverized sodium hydroxide followed by 150 parts by weight of a mixture containing 3 parts of ethylene oxide and 1 part 1,2-propylene oxide. The temperature is maintained at about 115° C. during the reaction and the oxide mixture is supplied at such a rate as to maintain a pressure of about 25 pounds per square inch. The reaction was interrupted at varying intervals in order to secure derivatives having molecular weights of 1500, 2500, 3500 and 5000.

*Example VI*

One hundred (100) parts by weight of a mixture of equal parts of ethylene oxide and propylene oxide is introduced into 50 parts by weight of the ethyl ester of 4-hydroxy naphthoic acid containing 1 part of boron trifluoride dispersed therein. The temperature is maintained at about 115° C. and the oxide mixture is introduced into the ester at such a rate that the pressure is maintained at about 25 pounds per square inch over a period of about 5 hours.

Fifty (50) parts by weight of the above reaction product is further reacted in accordance with the directions of step 2 of Example I.

Example VII

One hundred (100) parts by weight of a mixture of equal parts of ethylene oxide and propylene oxide is introduced into 50 parts by weight of ethyl salicylate containing 1 part of boron trifluoride dispersed therein. The temperature is maintained at about 120° C. and the oxide mixture is introduced into the ethyl salicylate at such a rate that the pressure is maintained at 30 pounds per square inch over a period of about 5 hours.

Fifty (50) parts by weight of the above reaction product is further reacted in accordance with the directions of step 2 of Example I.

Example VIII

One hundred (100) parts by weight of a mixture of 3 parts of propylene oxide and 1 part of ethylene oxide are introduced into 50 parts of the sodium salt of 4-hydroxy benzenesulfonic acid containing 3 parts of pulverized sodium hydroxide dispersed therein. The temperature is maintained at about 120° C. and the oxide mixture is introduced into the sodium salt at such a rate that the pressure is maintained at about 30 pounds per square inch over a period of about 4 hours.

To 40 parts by weight of the above reaction product is added 3 parts by weight of pulverized sodium hydroxide followed by 85 parts by weight of a mixture consisting of 3 parts of propylene oxide and 1 part of ethylene oxide. The temperature is maintained at about 115° C. during the reaction and the oxide mixture is supplied at such a rate as to maintain a pressure of about 22 pounds per square inch. The reaction is interrupted at varying intervals to obtain derivatives having molecular weights of about 1500, 2500, 3500 and 5000.

Example IX

One hundred (100) parts by weight of a mixture of 3 parts of propylene oxide and 1 part of ethylene oxide are introduced into 50 parts of sodium citrate containing 3 parts of pulverized sodium hydroxide dispersed therein. The temperature is maintained at about 115° C. and the oxide mixture is introduced into the sodium citrate at such a rate that the pressure is maintained at about 32 pounds per square inch over a period of about 4 hours.

To 40 parts by weight of the above reaction product is added 3 parts by weight of pulverized sodium hydroxide followed by 85 parts by weight of a mixture consisting of 3 parts of propylene oxide and 1 part of ethylene oxide. The temperature is maintained at about 110° C. during the reaction and the oxide mixture is supplied at such a rate as to maintain pressure of about 24 pounds per square inch. The reaction is interrupted at varying intervals to obtain derivatives having molecular weights of about 1500, 2500, 3500 and 5000.

Example X

The procedure is the same as Example VIII except that chemically equivalent proportions of the sodium salt of para amino salicylic acid are employed instead of the sodium salt of 4-hydroxy benzene sulfonic acid.

The finished products as prepared in accordance with the instructions of the preceding examples are of value in themselves. The oxylated esters, the oxyalkylated salts and the oxyalkylated amides all show effective demulsifying characteristics.

In the previous description, frequent reference has been made to heteric polyoxyalkylene diols and by the word "heteric" is meant that the diol constituents of the mixture vary in internal configuration from molecule to molecule, such variations arising out of a randomness of the distribution of the oxyethylene and oxypropylene groups therein, as results, for instance, from the concurrent reaction of the ethylene oxide and the propylene oxide on the starting material and the intermediate products.

Throughout the specification and claims the following definitions apply:

*Alkyl.*—A monovalent radical derived from an aliphatic hydrocarbon by removal of one hydrogen atom, as, for example, methyl, ethyl, propyl, octyl, cetyl, myricyl and their homologues, preferably containing 1 to 30 carbon atoms;

*Alkenyl.*—A monovalent radical derived from an unsaturated aliphatic hydrocarbon, as, for example, ethenyl (vinyl), allyl, undecenyl, octadecenyl, linolenyl, and their homologues, preferably containing 2 to 18 carbon atoms and having a single double bond;

*Aralkyl.*—A monovalent radical derived from an aromatic substituted aliphatic hydrocarbon, as, for example, benzyl, phenylethyl, phenylpropyl, phenylbutyl, phenyloctyl, phenylcetyl, phenyloctadecyl and homologues, preferably containing 1 to 30 carbon atoms in the alkyl chain;

*Cycloalkyl.*—A monovalent radical derived from a cycloaliphatic hydrocarbon, as, for example, cyclopentyl, cyclohexyl and cycloheptyl;

*Aralkenyl.*—A monovalent radical derived from an aromatic substituted unsaturated aliphatic hydrocarbon, as, for example, styryl, cinnamyl, and homologues;

*Aryl.*—A monovalent radical derived from an aromatic hydrocarbon by removal of one hydrogen atom, as, for example, phenyl and naphthyl;

In referring to the hydroxy carboxylic acid esters, the term "ester" includes the lower alkyl esters as, for example, those derived by reacting a free acid with methyl, ethyl, propyl, isopropyl, butyl, amyl and/or hexyl alcohols, as well as those derived from the higher alcohols such as lauryl alcohol, oleyl alcohol, stearyl alcohol and myricyl alcohol. In referring to the hydroxy carboxylic acid amides, the term "amide" includes those compounds in which the amido nitrogen is primary as well as those amides in which the amido nitrogen is secondary or tertiary. When the amido nitrogen is primary it is linked to two hydrogen atoms. When it is secondary, one of the hydrogen atoms is replaced by a carbon radical such as an alkyl group (e.g., methyl, ethyl, propyl, etc.). When it is tertiary, both of the hydrogen atoms are replaced by carbon radicals, as, for example, alkyl groups.

The demulsifying compositions are preferably employed in the proportion of 1 part of reagent to from 2000 to 50,000 parts of emulsion either by adding the concentrated product direct to the emulsion or after diluting with a suitable vehicle in the customary manner.

The suitable hydrocarbon vehicle referred to above is sulfur dioxide ($SO_2$) extract. This material is a byproduct from the Edeleanu process of refining petroleum in which the undesirable fractions are removed by extraction with liquid sulfur dioxide. After removal of the sulfur dioxide a mixture of hydrocarbons, substantially aromatic in character, remains which is designated in the trade as $SO_2$ extract. Examples of other suitable hydrocarbon vehicles are Gray Tower polymers, toluene, xylene, gas oil, diesel fuel, bunker fuel and coal tar solvents. The above cited examples of solvents are adaptable to azeotropic distillation as would also be any other solvent which is immiscible with water, miscible with the reacting mass and has a boiling point or boiling range in excess of the boiling point of water.

The products prepared in accordance with the invention are very useful in breaking petroleum emulsions, especially those in which the oil is paraffinic or paraffinic-naphthenic, and can be successfully used in breaking water-in-oil petroleum emulsions in the Mid-Continent oil fields, including Oklahoma, Illinois, Kansas, the Gulf Coast, Louisiana, Southwest Texas and California.

This application is a continuation-in-part of copending application, Serial No. 98,162 filed June 9, 1949, now abandoned.

The invention is hereby claimed as follows:

1. An oxyalkylated organic compound from the group consisting of oxyalkylated hydroxy carboxylic acid esters, oxyalkylated hydroxy carboxylates, oxyalkylated hydroxy carboxylic acid amides, oxyalkylated hydroxy sulfonic acid esters, oxyalkylated hydroxy sulfonates, and oxyalkylated hydroxy sulfonic acid amides wherein there are 1 to 2 hydroxy groups and 1 to 3 groups from the class consisting of carboxy and sulfonic, at least one of said hydroxy groups is oxyalkylated and the oxyalkyl groups consist of both oxyethylene and oxypropylene groups, with the further provisos that the oxypropylene groups constitute at least 20% by weight of all of the oxyalkylene groups in said oxyalkylated organic compound, that the weight ratio of oxyethylene to oxypropylene does not exceed 4:1, that the weight ratio of oxypropylene to oxyethylene does not exceed 3:1, that the hydroxy carboxylic acid esters, the hydroxy carboxylates, the hydroxy carboxylic acid amides, the hydroxy sulfonic acid esters, the hydroxy sulfonates and the hydroxy sulfonic acid amides are hydrocarbons substituted with hydroxy, carboxy and sulfonic radicals wherein only the hydroxy groups are oxyalkylated, that the oxyalkylated groups contain terminal hydroxy groups, that at least 60% of the molecular weight of the effective oxyalkylated organic compound is attributable to oxyalkylene groups and that the molecular weight is at least 1000, the total molecular weight of said oxyalkylated organic compound not exceeding 20,000.

2. An oxyalkylated organic compound from the group consisting of oxyalkylated hydroxy carboxylic acid esters, oxyalkylated hydroxy carboxylates, oxyalkylated hydroxy carboxylic acid amides, oxyalkylated hydroxy sulfonic acid esters, oxyalkylated hydroxy sulfonates, and oxyalkylated hydroxy sulfonic acid amides wherein there are 1 to 2 hydroxy groups and 1 to 3 groups from the class consisting of carboxy and sulfonic, at least one of said hydroxy groups is oxyalkylated and the oxyalkyl groups consist of both oxyethylene and oxypropylene groups, with the further provisos that the oxypropylene groups constitute at least 20% by weight of all of the oxyalkylene groups in said oxyalkylated organic compound, that the weight ratio of oxythylene to oxypropylene does not exceed 4:1, that the weight ratio of oxypropylene to oxyethylene does not exceed 3:1, that the hydroxy carboxylic acid esters, the hydroxy carboxylates, the hydroxy carboxylic acid amides, the hydroxy sulfonic acid esters, the hydroxy sulfonates and the hydroxy sulfonic acid amides are hydrocarbons substituted with hydroxy, carboxy and sulfonic radicals wherein only the hydroxy groups are oxyalkylated, that the oxyalkylated groups contain terminal hydroxy groups, that at least 60% of the molecular weight of the effective oxyalkylated organic compound is attributable to oxyalkylene groups, that no carbon chain in said oxyalkylated organic compound is longer than six carbon atoms, and that the molecular weight is at least 1000, the total molecular weight of said oxyalkylated organic compound not exceeding 20,000.

3. An oxyalkylated organic compound from the group consisting of oxyalkylated hydroxy carboxylic acid esters, oxyalkylated hydroxy carboxylates, oxyalkylated hydroxy carboxylic acid amides, oxyalkylated hydroxy sulfonic acid esters, oxyalkylated hydroxy sulfonates, and oxyalkylated hydroxy sulfonic acid amides wherein there are 1 to 2 hydroxy groups and 1 to 3 groups from the class consisting of carboxy and sulfonic, at least one of said hydroxy groups is oxyalkylated and the oxyalkyl groups consist of both oxyethylene and oxypropylene groups, with the further provisos that the oxypropylene groups constitute at least 20% by weight of all of the oxyalkylene groups in said oxyalkylated organic compound, that the weight ratio of oxyethylene to oxypropylene does not exceed 4:1, that the weight ratio of oxypropylene to oxyethylene does not exceed 3:1, that the hydroxy carboxylic acid esters, the hydroxy carboxylates, the hydroxy carboxylic acid amides, the hydroxy sulfonic acid esters, the hydroxy sulfonates and the hydroxy sulfonic acid amides are hydrocarbons substituted with hydroxy, carboxy and sulfonic radicals wherein only the hydroxy groups are oxyalkylated, that the oxyalkylated groups contain terminal hydroxy groups, that at least 60% of the molecular weight of the effective oxyalkylated organic compound is attributable to oxyalkylene groups and that the molecular weight attributable to oxypropylene groups is at least 2000, the total molecular weight of said oxyalkylated organic compound not exceeding 20,000.

4. An oxyalkylated organic hydroxy carboxylic acid ester wherein there are 1 to 2 hydroxy groups and 1 to 3 carboxy groups, at least one of said hydroxy groups is oxyalkylated and the oxyalkyl groups consist of both oxyethylene and oxypropylene groups, with the further provisos that the oxypropylene groups constitute at least 20% by weight of all of the oxyalkylene groups in said oxyalkylated organic ester, that the weight ratio of oxyethylene to oxypropylene does not exceed 4:1, that the weight ratio of oxypropylene to oxyethylene does not exceed 3:1, that the hydroxy carboxylic acid ester is a hydrocarbon substituted with hydroxy and carboxylic acid ester radicals wherein only the hydroxy group is oxyalkylated, that the oxyalkylated group contains terminal hydroxy groups, that at least 60% of the molecular weight of the effective oxyalkylated organic ester is attributable to oxyalkylene groups and that the molecular weight is at least 1000 the total molecular weight of said oxyalkylated organic hydroxy carboxylic acid ester not exceeding 20,000.

5. An oxyalkylated organic hydroxy carboxylate wherein there are 1 to 2 hydroxy groups and 1 to 3 carboxy groups, at least one of said hydroxy groups is oxyalkylated and the oxyalkyl groups consist of both oxyethylene and oxypropylene groups, with the further provisos that the oxypropylene groups constitute at least 20% by weight of all of the oxyalkylene groups in said oxyalkylated organic compound, that the weight ratio of oxyethylene to oxypropylene does not exceed 4:1, that the weight ratio of oxypropylene to oxyethylene does not exceed 3:1, that the hydroxy carboxylate is a hydrocarbon substituted with hydroxy and carboxylate radicals wherein only the hydroxy group is oxyalkylated, that the oxyalkylated group contains terminal hydroxy groups, that at least 60% of the molecular weight of the effective oxyalkylated organic compound is attributable to oxyalkylene groups and that the molecular weight is at least 1000, the total molecular weight of said oxyalkylated organic hydroxy carboxylate not exceeding 20,000.

6. An oxyalkylated organic hydroxy carboxylic acid amide wherein there are 1 to 2 hydroxy groups and 1 to 3 carboxy groups, at least one of said hydroxy groups is oxyalkylated and the oxyalkyl groups consist of both oxyethylene and oxypropylene groups, with the further provisos that the oxypropylene groups constitute at least 20% by weight of all of the oxyalkylene groups in said oxyalkylated organic compound, that the weight ratio of oxyethylene to oxypropylene does not exceed 4:1, that the weight ratio of oxypropylene to oxyethylene does not exceed 3:1, that the hydroxy carboxylic acid amide is a hydrocarbon substituted with hydroxy and carboxylic acid amide radicals wherein only the hydroxy group is oxyalkylated, that the oxyalkylated group contains terminal hydroxy groups, that at least 60% of the molecular weight of the effective oxyalkylated organic compound is attributable to oxyalkylene groups and that the molecular weight is at least 1000, the total molecular weight of said oxyalkylated organic hydroxy carboxylic acid amide not exceeding 20,000.

7. An oxyalkylated organic hydroxy carboxylic acid ester wherein there are 1 to 2 hydroxy groups and 1 to 3 carboxy groups, at least one of said hydroxy groups is oxyalkylated and the oxyalkyl groups consist of both oxyethylene and oxypropylene groups, with the further provisos that the oxypropylene groups constitute at least 20% by weight of all of the oxyalkylene groups in said oxyalkylated organic ester, that the weight ratio of oxyethylene to oxypropylene does not exceed 4:1, that the weight ratio of oxypropylene to oxyethylene does not exceed 3:1, that the hydroxy carboxylic acid ester is a hydrocarbon substituted with hydroxy and carboxylic acid ester radicals wherein only the hydroxy group is oxyalkylated, that the oxyalkylated group contains terminal hydroxy groups, that at least 60% of the molecular weight of the effective oxyalkylated organic ester is attributable to oxyalkylene groups, that no carbon chain in said oxyalkylated organic ester is longer than six carbon atoms, and that the molecular weight is at least 1000, the total molecular weight of said oxyalkylated organic hydroxy carboxylic acid ester not exceeding 20,000.

8. An oxyalkylated organic hydroxy carboxylic acid ester wherein there is one hydroxy group and 1 to 3 carboxy groups, the hydroxy group is oxyalkylated and the oxyalkyl groups consist of both oxyethylene and oxypropylene groups, with the further provisos that the oxypropylene groups constitute at least 20% by weight of all of the oxyalkylene groups in said oxyalkylated organic ester, that the weight ratio of oxyethylene to oxypropylene does not exceed 4:1, that the weight ratio of oxypropylene to oxyethylene does not exceed 3:1, that the hydroxy carboxylic acid ester is a hydrocarbon substituted with hydroxy and carboxylic acid ester radicals wherein only the hydroxy group is oxyalkylated, that the oxyalkylated group contains terminal hydroxy groups, that at least 60% of the molecular weight of the oxyalkylated organic ester is attributable to oxyalkylene groups, that no carbon chain in said oxyalkylated organic ester is longer than 6 carbon atoms, and the total molecular weight is within the range from 2100 to 7500.

9. An oxyalkylated lower alkyl ester of glycolic acid wherein the hydroxy group is oxyalkylated and the oxyalkyl groups consist of both oxyethylene and oxypropylene groups, with the further provisos that the oxypropylene groups constitute at least 20% by weight of all of the oxyalkylene groups in said ester, that the weight ratio of oxyethylene to oxypropylene does not exceed 4:1, that the weight ratio of oxypropylene to oxyethylene does not exceed 3:1, that only the hydroxy group of the glycolic acid ester radical is oxyalkylated, that the oxyalkylated groups contain terminal hydroxy groups, that at least 60% of the molecular weight of said ester is attributable to oxyalkylene groups, and the total molecular weight is within the range from 1500 to 5000.

10. An oxyalkylated lower alkyl ester of lactic acid wherein the hydroxy group is oxyalkylated and the oxyalkyl groups consist of both oxyethylene and oxypropylene groups, with the further provisos that the oxypropylene groups consistitute at least 20% by weight of all of the oxyalkylene groups in said ester, that the weight ratio of oxyethylene to oxypropylene does not exceed 4:1, that the weight ratio of oxypropylene to oxyethylene does not exceed 3:1, that only the hydroxy group of the lactic acid ester radical is oxyalkylated, that the oxyalkylated groups contain terminal hydroxy groups, that at least 60% of the molecular weight of the oxyalkylated ester is attributable to oxyalkylene groups, and the total molecular weight is within the range from 1500 to 5000.

References Cited in the file of this patent

UNITED STATES PATENTS

| | | |
|---|---|---|
| 2,307,494 | De Groote et al. | Jan. 5, 1943 |
| 2,341,846 | Meincke | Feb. 15, 1944 |
| 2,542,550 | McDermott | Feb. 20, 1951 |
| 2,562,878 | Blair | Aug. 7, 1951 |
| 2,599,538 | Blair | June 10, 1952 |
| 2,602,087 | De Groote | July 1, 1952 |
| 2,610,206 | Highet | Sept. 9, 1952 |
| 2,626,911 | De Groote | Jan. 27, 1953 |
| 2,648,703 | Stansbury et al. | Aug. 11, 1953 |
| 2,745,857 | Britton et al. | May 15, 1956 |